United States Patent
Fontenot et al.

(10) Patent No.: US 7,861,038 B2
(45) Date of Patent: Dec. 28, 2010

(54) METHOD AND APPARATUS FOR MANAGING DATA IN A HYBRID DRIVE SYSTEM

(75) Inventors: Nathan D. Fontenot, Cedar Park, TX (US); Joel Howard Schopp, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 11/778,914

(22) Filed: Jul. 17, 2007

(65) Prior Publication Data

US 2009/0024793 A1    Jan. 22, 2009

(51) Int. Cl.
*G06F 12/00* (2006.01)

(52) U.S. Cl. ..................................... 711/115
(58) Field of Classification Search ........................ None
See application file for complete search history.

(56) References Cited

U.S. PATENT DOCUMENTS

| | | | |
|---|---|---|---|
| 6,324,633 B1 * | 11/2001 | Flake et al. ................. | 711/173 |
| 6,493,800 B1 * | 12/2002 | Blumrich ..................... | 711/129 |
| 6,871,264 B2 * | 3/2005 | Soltis, Jr. .................... | 711/122 |
| 7,268,787 B2 * | 9/2007 | Hong et al. .................. | 345/543 |
| 7,610,438 B2 * | 10/2009 | Lee et al. ..................... | 711/103 |
| 7,627,756 B2 * | 12/2009 | Fujibayashi et al. ......... | 713/165 |
| 2002/0042863 A1 * | 4/2002 | Jeddeloh ...................... | 711/143 |
| 2002/0184445 A1 * | 12/2002 | Cherabuddi .................. | 711/130 |
| 2003/0093622 A1 * | 5/2003 | Desota et al. ................ | 711/129 |
| 2004/0201745 A1 | 10/2004 | Wess et al. | |
| 2006/0075183 A1 | 4/2006 | Lin et al. | |
| 2006/0090031 A1 | 4/2006 | Kirshenbaum et al. | |
| 2006/0230226 A1 * | 10/2006 | Meir et al. ................... | 711/113 |
| 2007/0038806 A1 | 2/2007 | Recio et al. | |
| 2008/0126785 A1 * | 5/2008 | Chong et al. ................. | 713/2 |

* cited by examiner

*Primary Examiner*—Hiep T Nguyen
(74) *Attorney, Agent, or Firm*—Yee & Associates, P.C.; Steven L. Bennett

(57) ABSTRACT

The illustrative embodiments described herein provide an apparatus and method for managing data in a hybrid drive system. In one embodiment, a process determines whether the detachable memory contains clean data in response to identifying that a cache portion of a detachable memory is unavailable. The clean data does not require a disk to be in a spin state to be removed from the detachable memory. The process removes the clean data from the detachable memory in response to determining that the detachable memory contains the clean data. The process stores the data on the detachable memory.

35 Claims, 7 Drawing Sheets

METHOD AND APPARATUS FOR MANAGING DATA IN A HYBRID DRIVE SYSTEM

BACKGROUND OF THE INVENTION

1. Field of the Invention

The present invention relates generally to a data processing system and in particular to a method and apparatus for managing data. More particularly, the present invention is directed to a computer-implemented method, apparatus, and computer-usable program code for managing data in a hybrid drive system.

2. Description of the Related Art

Modern data processing systems have begun using hybrid drive systems to manage data. A hybrid drive system includes a storage device, such as a hard disk, and a cache of memory to buffer data that is passed to or retrieved from the hybrid drive system. The cache in a hybrid drive system is typically employed to decrease the amount of time that a hard disk in the hybrid drive system must be in a spin state. A storage device, such as a hard disk, is in a spin state when the storage device is in motion. The hard disk of a hybrid drive system is normally at rest, and only enters a spin state in particular situations.

When a write operation is performed in a hybrid drive system, the cache is used to store data that would normally have been written to the hard disk in order to prevent having to spin the hard disk for a write operation. For example, while working on a text document or browsing on the Internet, temporary save files are saved to the cache instead of being written to the hard disk. When a read operation is performed in a hybrid drive system, the data processing system determines whether the requested data may be retrieved from the cache without resorting to the hard disk. Retrieving the requested data from the cache without resorting to the hard disk allows the requested data to be retrieved without having to spin the hard disk.

Conventional hard disks that do not employ a cache must be spun each time a read or write operation is performed on the hard disk. For example, if an application requests data that resides on the hard disk, the hard disk must be in a spin state in order for the data to be read. Likewise, if an application sends data to be written to a hard disk, the hard disk must be in a spin state in order for the data to be written to the hard disk.

Spinning the hard disk each time a read or write operation takes place increases the amount of time that the hard disk must be in a spin state. Increasing the amount of time that the hard disk is in a spin state increases the amount of power consumed by the hard disk. This increased power consumption leads to a reduction in the battery life of some data processing systems, such as laptop computers. In addition, the hard disk experiences increased wear, generates additional heat, and emits more noise while in a spin state for extended periods of time.

One current method implemented by some hybrid drive systems transfers the entire data content of the cache to the hard disk when the cache becomes full. However, because this method requires that the hard disk enter a spin state each time the cache becomes full, the method leads to increased power consumption, increased hard disk wear, increased heat generation, and increased noise emission.

Another current method implemented by some hybrid drive systems retrieves requested data directly from the hard drive if the requested data cannot be retrieved from the cache, thereby requiring that the hard disk enter a spin state. However, this method fails to implement additional transfers of data that are unrelated to the requested data so as to prevent having to spin the hard disk at a later time. Hence, the hard disk must be spun unnecessarily at a later time, thereby leading to increased power consumption, increased hard disk wear, increased heat generation, and increased noise emission.

Another current approach implemented by some hybrid drive systems allows the cache contained on a detachable memory device to be detached from the data processing system. However, this approach fails to provide a solution to the detachment of a cache while an operation associated with the cache is being performed. Thus, a loss of data may result if the cache is detached from the data processing system when an operation is being performed on the cache. This approach also fails to address flexibility issues regarding cache parameters, such as cache size and the encryption of data stored in the cache. Additionally, a user is precluded from expanding the amount of cache by adding additional detachable memory components to the data processing system.

SUMMARY OF THE INVENTION

The illustrative embodiments described herein provide an apparatus and method for managing data in a hybrid drive system. In one embodiment, a process determines whether a detachable memory contains clean data in response to identifying that a cache portion of a detachable memory is unavailable. In one example, the detachable memory may be a universal serial bus storage device. The clean data does not require a disk to be in a spin state to be removed from the detachable memory. The process removes the clean data from the detachable memory in response to determining that the detachable memory contains the clean data. In an alternate embodiment, the process deletes the clean data from the detachable memory. The process stores write data on the detachable memory.

In another embodiment, the process identifies whether the cache portion of the detachable memory is expandable. In this embodiment, the process may identify whether a non-cache portion of the detachable memory contains removable data. The process may also send a prompt to a user to remove the removable data in response to identifying that the non-cache portion of the detachable memory contains removable data. In this embodiment, the process may also identify whether additional detachable memory is receivable by the data processing system. The process may expand the cache portion of the detachable memory to include a cache portion of the additional detachable memory.

In an alternate embodiment, the cache portion of the detachable memory is a user-definable portion of the detachable memory. The cache portion of the detachable memory may also be a portion of the detachable memory that is not occupied by user files. The cache portion of the detachable memory may also include non-detachable memory.

In another embodiment, the process of storing the write data on the detachable memory includes encrypting the write data to form encrypted data. The process then stores the encrypted data on the detachable memory.

In another embodiment, a process identifies that a detachable memory does not contain requested data. The process reads the requested data from a disk while the disk is in a spin state. The process initiates a transfer of dirty data from the detachable memory to the disk while the disk is in the spin state. The dirty data requires the disk to be in the spin state to be removed from the detachable memory.

In an alternate embodiment, the dirty data, after the transfer of the dirty data from the detachable memory to the disk while the disk is in the spin state, becomes clean data, wherein the clean data does not require the disk to be in the spin state to be removed from the detachable memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
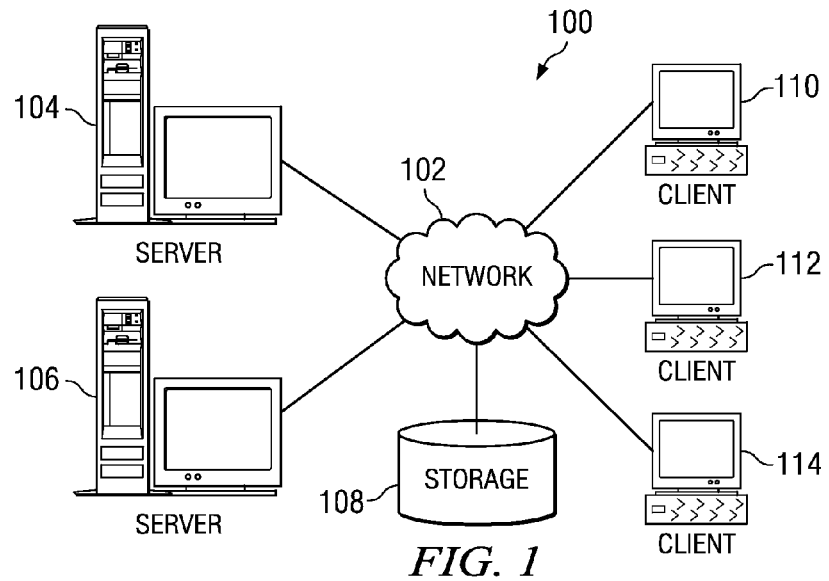
FIG. 1 is a pictorial representation of a network data processing system in which the illustrative embodiments may be implemented.
Figure 2:
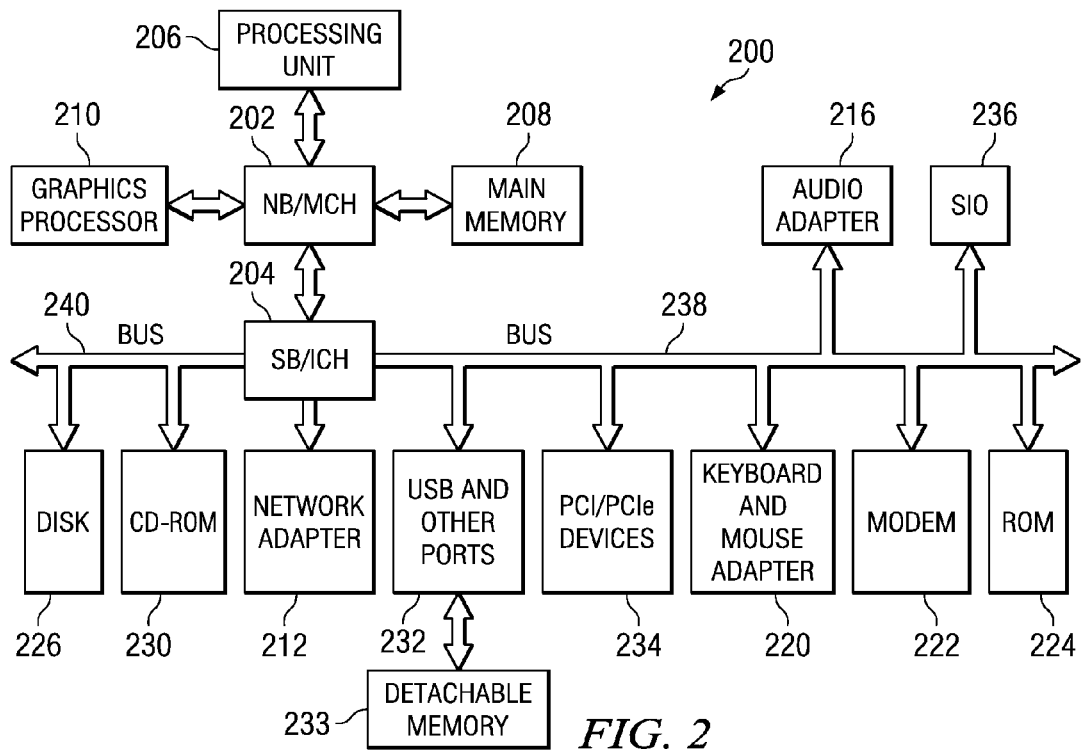
FIG. 2 is a block diagram of a data processing system in which the illustrative embodiments may be implemented.

With reference now to the Figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. Storage unit 108 may be implemented as part of a hybrid drive system. In addition, clients 110, 112, and 114 connect to network 102. Clients 110, 112, and 114 may be, for example, personal computers or network computers. Also, clients 110, 112, and 114 and servers 104 and 106 are configured to receive detachable memory. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. Hard disk drive 226 and CD-ROM 230 may be implemented as part of a hybrid drive system. A super I/O (SIO) device 236 may be coupled to south bridge and I/O controller hub 204.

USB and other ports 232 are able to receive detachable memory 233 using any type of connection through which data may be transferred. For example, detachable memory 233 may be connected to USB and other ports 232 using connections types such as USB, firewire, Peripheral Component Interconnect (PCI), optical, and Ethernet connections. Non-limiting examples of detachable memory 233 includes a USB flash drive, an external hard drive, and a pocket hard drive.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
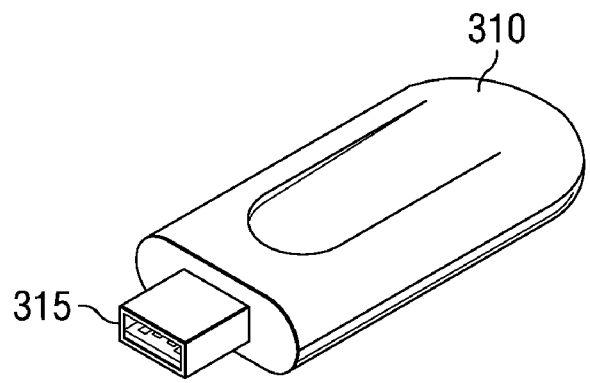
FIG. 3 is a diagram of a detachable memory in a system for managing data in a hybrid drive system in accordance with an illustrative embodiment.

Turning now to FIG. 3, a diagram of a detachable memory in a system for managing data in a hybrid drive system is depicted in accordance with an illustrative embodiment. Specifically, FIG. 3 shows a detachable memory, such as detachable memory 233 in FIG. 2.

Detachable memory 310 is a universal serial bus (USB) storage device. Detachable memory 310 may be connected to a data processing system, such as data processing system 200 in FIG. 2, via USB connection 315. USB connection 315 may be inserted into a USB port, such as USB and other ports 232 in FIG. 2.

Detachable memory 310 may contain any amount of storage space. For example, detachable memory may contain 500 megabytes, 1 gigabyte, or 10 gigabytes of storage space. Detachable memory 310 may also contain a cache portion and a non-cache portion.

Although FIG. 3 depicts detachable memory 310 as having a USB connection 315, detachable memory 310 may have any type of connection. For example, USB connection 315 may be a firewire, peripheral component interconnect (PCI), optical, or Ethernet connection.

Figure 4:
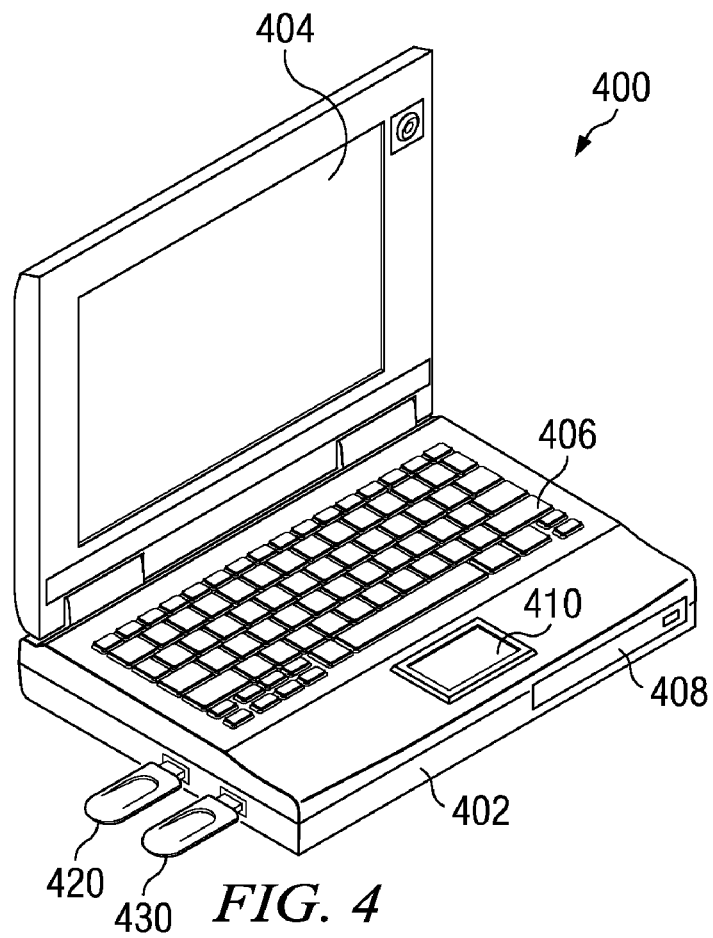
FIG. 4 is a pictorial representation of a data processing system for managing data in a hybrid drive system in accordance with an illustrative embodiment.

Turning now to FIG. 4, a pictorial representation of a data processing system for managing data in a hybrid drive system is depicted in accordance with an illustrative embodiment. Specifically, FIG. 4 illustrates mobile computer 400, which is a non-limiting example of data processing system 200 in FIG. 2.

Mobile computer 400 includes system unit 402, video display terminal 404, keyboard 406, storage devices 408, which may include floppy drives and other types of permanent and removable storage media, and pointer device 410. Additional input devices may be included with mobile computer 400, such as, for example, a mouse, joystick, touch screen, trackball, microphone, and the like. Mobile computer 400 may be implemented using any suitable computer, such as an IBM Thinkpad computer, which is a product of International Business Machines Corporation, located in Armonk, N.Y. Mobile computer 400 also preferably includes a graphical user interface (GUI) that may be implemented by means of systems software residing in computer-readable media in operation within mobile computer 400.

Detachable memories 420 and 430 are attached to mobile computer 400. Detachable memories 420 and 430 are each examples of detachable memory 233 of FIG. 2. Although FIG. 4 shows two detachable memories 420 and 430 attached to mobile computer 400, mobile computer 400 may contain any number of detachable memories, such as 1, 4, or 7. The number of ports for mobile computer 400 may also be expanded to allow for additional detachable memories to be receivable by mobile computer 400.

Because mobile computer 400 may contain multiple detachable memories, the cache portions of detachable memories 420 and 430 may be aggregated into a larger cache portion. The larger cache portion provides a larger buffer space for the hybrid drive system in mobile computer 400, thereby reducing the amount of time that a disk contained in mobile computer 400 must be in a spin state. Hence, the disk uses less power and the battery life of the one or more batteries in mobile computer 400 is extended.

The illustrative embodiments described herein provide an apparatus and method for managing data in a hybrid drive system. In one embodiment, a process determines whether the detachable memory contains clean data in response to identifying that a cache portion of a detachable memory is unavailable.

Clean data is data that does not require a disk to be in a spin state in order to be removed from the detachable memory. For example, clean data may be data that is stored on both the detachable memory and the disk. Thus, clean data may be removed from the detachable memory without causing the clean data to be inaccessible to a data processing system and without causing the disk to enter a spin state. Also, in one embodiment, clean data is different from the write data.

Detachable memory is any memory that may be detached from a data processing system. A disk is in a spin state when the disk is in motion, such as spinning relative to an axis.

The cache portion of a detachable memory is unavailable if any hindrance exists to the storage of data on the cache portion. In one embodiment, the cache portion of a detachable memory is unavailable if the detachable memory does not include a sufficient amount of storage space to store write data that is being written to the cache portion by any component of a data processing system.

The process removes the clean data from the detachable memory in response to determining that the detachable memory contains the clean data. In one example, removing the clean data from the detachable memory includes deleting the clean data from the detachable memory. The process stores the write data on the detachable memory. In one embodiment, the process of storing the write data on the detachable memory includes encrypting the write data to form encrypted data. In this embodiment, the process stores the encrypted data on the detachable memory.

In another embodiment, a process identifies that a detachable memory does not contain requested data. The process reads the requested data from a disk while the disk is in a spin state. The process initiates a transfer of dirty data from the detachable memory to the disk while the disk is in the spin state. Dirty data requires the disk to be in the spin state to be removed from the detachable memory.

Figure 5:
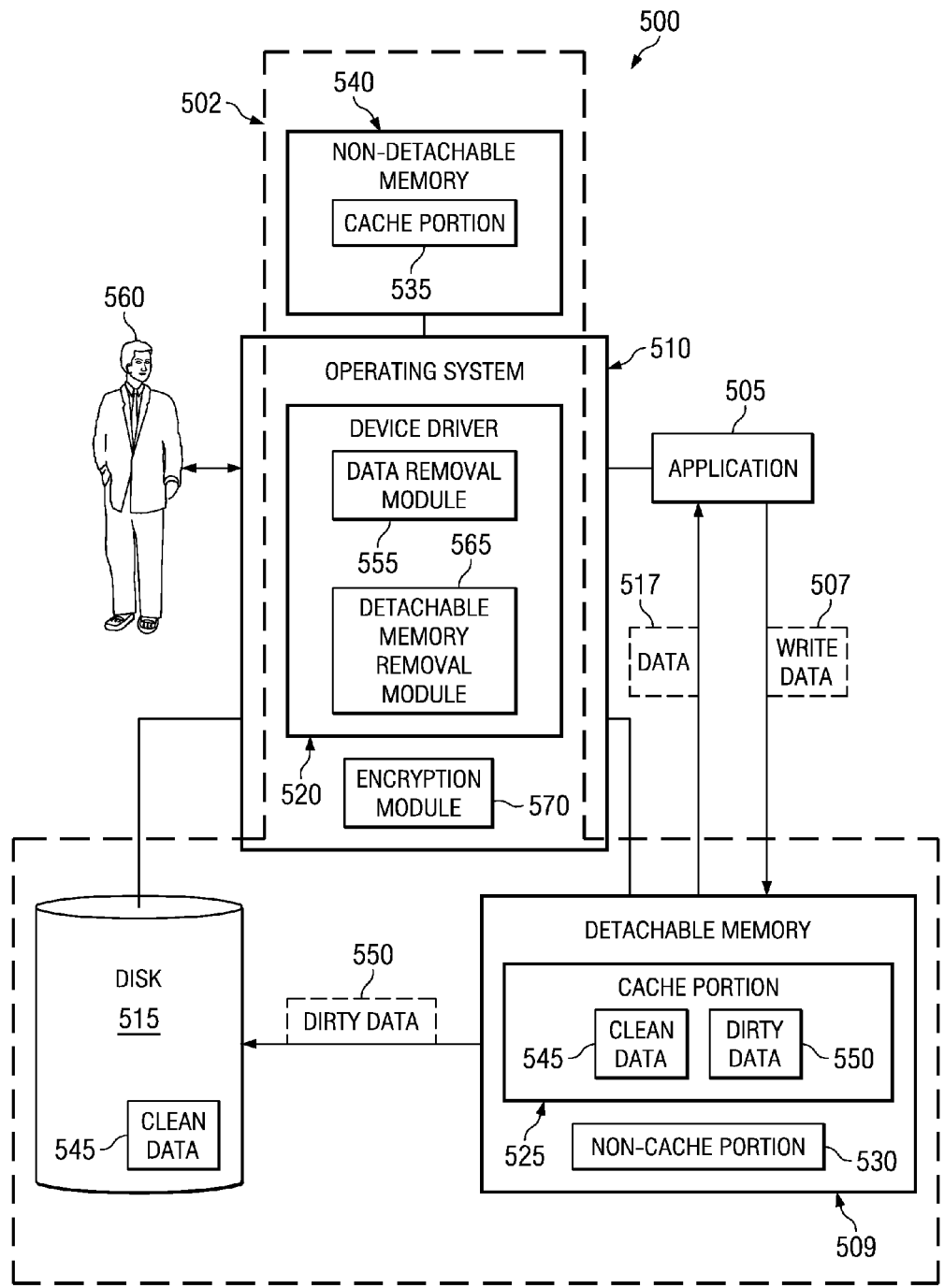
FIG. 5 is a block diagram of a system for managing data in a hybrid drive system in accordance with an illustrative embodiment.

Turning now to FIG. 5, a block diagram of a system for managing data in a hybrid drive system is depicted in accordance with an illustrative embodiment. Specifically, FIG. 5 depicts data processing system 500, which contains components to manage data using a hybrid drive system. Examples of data processing system 500 include data process system 100 in FIG. 1, and data processing system 200 in FIG. 2.

Data processing system 500 includes hybrid drive system 502, which includes various components of data processing system 500. A hybrid drive system is a system used to manage data that can reduce the amount of time that a disk, such as disk 515, must be in a spin state. Hybrid drive system 502 exemplifies an illustrative embodiment of a hybrid drive system, and is not meant to imply architectural limitations on the manner in which a hybrid drive system may be implemented. For example, hybrid drive system 502 may include additional hard drives, detachable memories, non-detachable memories, or device drivers. Hybrid drive system 502 may also include other types of storage devices that have spin states. In another non-limiting example, hybrid drive system 502 includes detachable memory 509, device driver 520, and disk 515. As shown below, additional components may also be included in hybrid drive system 502 of data processing system 500.

Application 505 executes on data processing system 500. Application 505 may be any application that utilizes data that is capable of being stored in a storage device. For example, application 505 may utilize operations that read and write data to a hard drive, such as hard disk drive 226 in FIG. 2. Application 505 may also be a login shell, an operating system, a command, an executable, a process, a daemon, or any other component of data processing system 500 that utilizes storable data.

Although application 505 is shown in FIG. 5 as part of operating system 510, application 505 may be located on a remote computing device at a remote location, such as clients 110, 112, and 114 in FIG. 1. Application 505 may be connected to operating system 510 by a network, such as network 102 in FIG. 1. Also, although application 505 is shown as separate from operating system 510, application 505 may be a component or sub-process of operating system 510.

During a write operation, application 505 sends write data 507 to be written to a storage device. Non-limiting examples of application 505 sending data to be written to a storage device include a word processor performing a 'save' operation, or changing a file name in a file directory system.

Write data 507 may be any data that is capable of being stored. For example, write data 507 may be data that is sent by application 505 for storage on a component of data processing system 500. Although FIG. 5 depicts write data 507 as being passed directly between application 505 and detachable memory 509, write data 507 may pass though any number of intervening components before reaching detachable memory 509. For example, write data 507 may pass through operating system 510 or any component shown as part of data processing system 200 in FIG. 2.

Data processing system 500 includes detachable memory 509. Detachable memory 509 is any storage device that may be detached from data processing system 500. For example, detachable memory 509 may be a storage device connected via a universal serial bus, peripheral component interconnect (PCI), firewire, PCI-X, PCI-Express, an optical connection, or an Ethernet connection. Non-limiting examples of detachable memory 509 includes a hard drive, such as hard disk drive 226 in FIG. 2, a USB flash drive, an external hard drive, an optical hard drive, and a pocket hard drive.

Although FIG. 5 depicts detachable memory 509 as included in data processing system 500, detachable memory 509 may also be located at a remote location. For example, detachable memory 509 may be connected to data processing system 500 via a network, such as network 102 in FIG. 1.

Also, although FIG. 5 depicts a single detachable memory 509, data processing system 500 may include any number of detachable memories. In one example, data processing system 500 includes a number of detachable memories that equals the number of ports by which detachable memories may be received by data processing system 500. Additional detachable memory may be received by data processing system 500 if the additional detachable memory may be added to the total memory resources of data processing system 500.

In another example, cache portion 525 is expandable by attaching additional detachable memories to data processing system 500. In this example, the cache portions of each of the detachable memories attached to data processing system 500 are aggregated to form an aggregated cache portion that may be used in a hybrid drive system.

In another embodiment, cache portion 525 of detachable memory 509 includes non-detachable memory 540. For example, cache portion 535 may be allocated from non-detachable memory 540 to be included as part of cache portion 525. Non-detachable memory 540 may be random access memory, built-in flash storage, or any other memory that is built into data processing system 500. An example of non-detachable memory 540 is main memory 208 of data processing system 200 in FIG. 2. In this embodiment, cache portions 525 and 535 are aggregated to form an aggregated cache portion that may be used in a hybrid drive system.

For example, disk 515 may contain 100 gigabytes of storage space, and cache portion 525 may contain 2 gigabytes of flash cache. In this example, if detachable memory 509 has a 4 gigabyte flash cache portion 525 and is added to data processing system 500, the hybrid drive system in data processing system 500 would behave like a 100 gigabyte hybrid drive with 6 gigabytes of flash cache. Additional illustrative embodiments of detachable memory 509 are discussed in further detail with respect to FIG. 9 below.

Detachable memory 509 contains cache portion 525 and non-cache portion 530. Cache portion 525 is any portion of memory in detachable memory 509 that buffers data for the hybrid drive system of data processing system 500. In one example, the necessity of accessing disk 515 is eliminated by using cache portion 525 to buffer data that is being sent or requested by application 505. By eliminating the necessity to access disk 515, disk 515 is prevented from having to enter a spin state.

Disk 515 is any storage device that must be in motion while certain operations, such as some read and write operations, are being performed thereon. Examples of disk 515 include storage unit 108 in FIG. 1 and hard disk drive 226 in FIG. 2. Although FIG. 5 shows a single disk in data processing system 500, data processing system 500 may contain any number of disks. Furthermore, cache portion 525 may be used to buffer data for two or more disks in data processing system 500.

In one example of the operation of cache portion 525, during a write operation performed by data processing system 500, cache portion 525 is used to store write data 507. In this example, if data processing system 500 did not employ a hybrid drive system, write data 507 would have been written directly to disk 515 instead of cache portion 525, thereby requiring disk 515 to enter a spin state.

In another example of the operation of cache portion 525, during a read operation performed by data processing system 500, operating system 510 determines whether data 517, which is requested by application 505, may be retrieved from cache portion 525 without resorting to disk 515. In this example, if data processing system 500 did not employ a hybrid drive system, data 517 would have been read directly from disk 515, thereby requiring disk 515 to enter a spin state.

Data 517 is any data that is capable of being stored on and retrieved from a storage device. For example, data 517 may be data that is requested by application 505 from a component of data processing system 500, such as disk 515 or cache portion 525. Although FIG. 5 depicts data 517 as being passed directly between application 505 and detachable memory 509, data 517 may pass though any number of intervening components before reaching detachable memory 509. For example, data 517 may pass through operating system 510 or any component shown as part of data processing system 200 in FIG. 2.

Non-cache portion 530 includes any portion of detachable memory 509 that is not included in cache portion 525. Additional illustrative embodiments of the configuration of cache portion 525 and non-cache portion 530 within detachable memory 509 will be discussed in conjunction with FIG. 8.

Device driver 520 detects when application 505 sends write data 507 to be written to a storage device. Upon detecting the transfer of write data 507 by application 505, device driver 520 determines whether cache portion 525 of detachable memory 509 is available. For example, device driver 520 may determine whether cache portion 525 includes a sufficient amount of storage space such that write data 507 may be stored on cache portion 525. If device driver 520 determines that cache portion 525 is available, then write data 507 is written to cache portion 525.

In one embodiment, upon detecting write data 507 being sent from application 505, device driver 520 identifies that cache portion 525 is unavailable. Cache portion 525 of detachable memory 509 is unavailable if any hindrance exists to the storage of write data 507 on cache portion 525. For example, cache portion 525 may be unavailable if detachable memory 509 does not include a sufficient amount of storage space to store write data 507. In this example, detachment memory 509 does not include a sufficient amount of storage space to store write data 507 because detachment memory 509 is fully occupied by non-cache portion 530.

In response to identifying that cache portion 525 is unavailable, device driver 520 determines whether detachable memory 509 contains clean data 545. In one embodiment, clean data 545 is different from write data 507. Clean data 545, does not require disk 515 to be in a spin state in order to be removed from detachable memory 509. For example, clean data 545 may be data that is stored on both cache portion 525 of detachable memory 509 and disk 515. Thus, clean data 545 may be removed from detachable memory 509 without causing clean data 545 to be inaccessible and without causing disk 515 to enter a spin state.

Because detachable memory 509 contains clean data 545, device driver 520 identifies that detachable memory 509 contains clean data 545. Upon identifying that detachable memory 509 contains clean data 545, data removal module 555 causes clean data 545 to be removed from detachable memory 509. In one embodiment, data removal module 555 removes clean data 545 from detachable memory 509 by deleting clean data 545 from detachable memory 509, thereby making additional storage space available on cache portion 525. In this embodiment, write data 507 is written to cache portion 525 after the deletion of clean data 545 from cache portion 525.

Data removal module 555 may remove all or a portion of clean data 545 on cache portion 525. In determining the portion of clean data 545 to be removed from cache portion 525, data removal module 555 may utilize a least-recently-used algorithm. For example, data removal module 555 may use a least-recently-used algorithm to remove the portion of clean data 545 that is least recently used by user 560 or a component of data processing system 500.

Although FIG. 5 shows that detachable memory 509 contains clean data 545, detachable memory 509 may also lack clean data 545. In this example, device driver 520 determines that detachable memory 509 does not contain clean data 545. Thus, operating system 510 may cause disk 515 to enter a spin state such that dirty data 550 is transferred from cache portion 525 to disk 515. Write data 507 may also be written onto disk 515 while disk 515 is in a spin state. Dirty data 550 is data that requires disk 515 to be in a spin state in order to be removed from detachable memory 509.

In one example, dirty data 550 that is transferred from detachable memory 509 to disk 515 is retained on detachable memory 509. In this example, dirty data 550 becomes clean data because dirty data 550 no longer requires disk 515 to be in a spin state in order to be removed from detachable memory 509. In another example, clean data 545 may be transferred to detachable memory 509 from various components of data processing system 500, such as non-detachable memory 540.

Data removal module 555 may transfer dirty data 550 to disk 515 at any time during which disk 515 is in a spin state, regardless of the reason why disk 515 is in a spin state. For example, if disk 515 enters a spin state due to the performance of self-diagnostics or due to a cache read miss, data removal module 555 may transfer all or a portion of dirty data 550 to disk 515. Thus, the transfer of dirty data 550 will not require disk 515 to enter a spin state an additional time for the transfer of dirty data 550 to take place.

Device driver 520 may also identify whether cache portion 525 is expandable. In one example, device driver 520 identifies whether cache portion 525 is expandable in response to identifying that cache portion 525 is unavailable. Device driver 520 may also identify whether cache portion 525 is expandable in response to identifying both that cache portion 525 is unavailable and that cache portion 525 does not contain clean data 545. In addition, device driver 520 may identify whether cache portion 525 is expandable in response to input from user 560.

In one embodiment, upon identifying that cache portion 525 is expandable, device driver 520 identifies whether non-cache portion 530 contains removable data. Removable data is any data that may be removed by user 560 or data processing system 500. Non-limiting examples of removable data include user files that are associated with a particular application, such as a word processor, an Internet application, or a spreadsheet application.

In this embodiment, device driver 520 may also send a prompt to user 560 in response to identifying that non-cache portion 530 contains removable data. The prompt may indicate to user 560 that removable data exists on detachable memory 509. The prompt may also ask user 560 to remove files from detachable memory 509. Also, the prompt may allow user 560 to launch an automated process that removes removable data from detachable memory 509. Upon the removal of removable data from detachable memory 509, additional storage space will be available for cache portion 525 such that write data 507 may be stored on detachable memory 509.

Alternatively, device driver 520 may automatically remove removable data from non-cache portion 530 in response to identifying that non-cache portion 530 contains removable data. User 560 may set parameters for device driver 520 that instruct device driver 520 how to remove the removable data on non-cache portion 530. For example, user 560 may indicate certain file types that should be deleted from non-cache portion 530 in response to device driver 520 identifying that non-cache portion 530 contains removable data.

Device driver 520, in identifying whether cache portion 525 is expandable, may also identify whether additional detachable memory is receivable by data processing system 500. Additional detachable memory is receivable by data processing system 500 if the additional detachable memory may be added to the total memory resources of data processing system 500.

Additional detachable memory is any memory that may be detached from a data processing system 500. For example, additional detachable memory may be a storage device connected via a universal serial bus, peripheral component interconnect, firewire, an optical connection, or an Ethernet connection.

In one embodiment, device driver 520 expands cache portion 525 to include a cache portion of the additional detachable memory, thereby increasing the storage space available for cache portion 525. Thus, additional storage space will be available for cache portion 525 such that write data 507 may be stored on detachable memory 509 without requiring disk 515 to enter a spin state.

In an alternate embodiment, data 517 is requested by application 505 from the hybrid drive system of data processing system 500. In response to detecting that application 505 has requested data 517, device driver 520 determines whether detachable memory 509 contains data 517. If device driver 520 determines that detachable memory 509 contains data 517, data 517 is sent to application 505.

In one embodiment, device driver 520 identifies that detachable memory 509 does not contain data 517. Disk 515 then enters a spin state. Device driver 520 reads data 517 from disk 515 while disk 515 is in a spin state. Data 517 is sent to application 505. While disk 515 is in a spin state, device driver 520 initiates a transfer of dirty data 550 from detachable memory 509 to disk 515. Dirty data 550 requires disk 515 to be in a spin state in order to be removed from detachable memory 509.

In an alternative embodiment, dirty data 550, after the transfer of dirty data 550 from detachable memory 509 to disk 515 while disk 515 is in the spin state, becomes clean data 545, wherein clean data 545 does not require disk 515 to be in the spin state to be removed from detachable memory 509. For example, dirty data 550 that is transferred from detachable memory 509 to disk 515 may be retained on detachable memory 509 such that a copy of dirty data 550 exists on both detachable memory 509 and disk 515. Hence, dirty data 550 may be removed from detachable memory 509 without requiring disk 515 to enter a spin state. Therefore, dirty data 550 becomes clean data 545.

Device driver 520 includes detachable memory removal module 565. Detachable memory removal module 565 manages the removal of detachable memory 509 from data processing system 500. In one embodiment, detachable memory 509 must be unmounted before being safely removed from data processing system 500. Unmounting detachable memory 509 ensures that no files or hardware of detachable memory 509 or data processing system 500 are harmed when detachable memory 509 is removed. The unmounting process may be initiated by user 560 or automatically by data processing system 500.

During the unmounting process, detachable memory removal module 565 may transfer dirty data 550 from detachment memory 509 to disk 515. Transferring dirty data 550 to disk 515 ensures that a copy of dirty data 550 is retained by data processing system 500 when detachable memory 509 is removed. Optionally, dirty data 550 may be deleted from detachable memory 509 after being transferred to disk 515.

Removing detachable memory 509 from data processing system 500 while an operation is being performed on detachable memory 509 may result in damage to either or both of detachable memory 509 or data processing system 500. The files contained on detachable memory 509 and data processing system 500 may also be damaged. To prevent the removal of detachable memory 509 from data processing system 500, detachable memory removal module 565 may control a physical lock that can prevent user 560 from removing detachable memory 509. For example, detachable memory removal module 565 may instruct a physical lock-to-lock detachable memory 509 to data processing system 500 until detachable memory 509 is unmounted.

In another embodiment, detachable memory removal module 565 may halt all operations associated with detachable memory 509 or disk 515 when detachable memory removal module 565 detects that detachable memory 509 is being removed. Detachable memory removal module 565 may then display a warning to user 560 to reattach detachable memory 509.

Operating system 510 includes encryption module 570. Encryption module 570 encrypts write data 507 to form encrypted data. The encrypted data is then stored on detachable memory 509. Encrypting write data 507 prevents the content of write data 507 from being discovered by an unauthorized user. The encryption may be linked to digital rights management so that only the hardware of data processing system can read the encrypted data. Write data 507 may also be encrypted using a private key to aid in the recovery of write data 507 should data processing system 500 become inoperable.

Device driver 520 and encryption module 570 may be installed on data processing system 500 from a variety of sources. In one embodiment, user 560 sends a set of parameters about hybrid drive system 502 in data processing system 500. In this embodiment, user 560 may be a customer. The set of parameters may be received by a second data processing system, such as servers 104 and 106, over a network, such as network 102 in FIG. 1. The second data processing system that receives the set of parameters may then identify a data management application for use in data processing system 500 in response to receiving the set of parameters to form an identified data management application. In one example, the identified data management application is either or both of device driver 520 and encryption module 570. In another example, the data management application includes computer usable program code capable of determining whether a cache portion of a detachable memory is unavailable in response to receiving a request to store the write data in the hybrid drive system. The computer usable program code is also capable of determining whether the detachable memory contains clean data in response to determining that the cache portion of the detachable memory is unavailable, wherein the clean data does not require a disk to be in a spin state to be removed from the detachable memory. The computer usable program code removes the clean data from the detachable memory in response to determining that the detachable memory contains the clean data. Also, the computer usable program code stores the write data on the detachable memory after removing the clean data when the computer usable program code is deployed in data processing system 500.

The second data processing system that received the set of parameters may then deploy the identified data management application to data processing system 500. In one embodiment, deploying the identified data management application includes transmitting computer usable program code for the data management application to data processing system 500.

In another example, a billing transaction may take place between user 560 and the second data processing system that receives the set of parameters about hybrid drive system 502. For example, user 560 may be charged a fee for downloading the identified data management application, such as device driver 520 or encryption module 570 onto data processing system 500. In another example, user 560 may purchase a software package containing the identified data management application, such as device driver 520 or encryption module 570.

Figure 6:
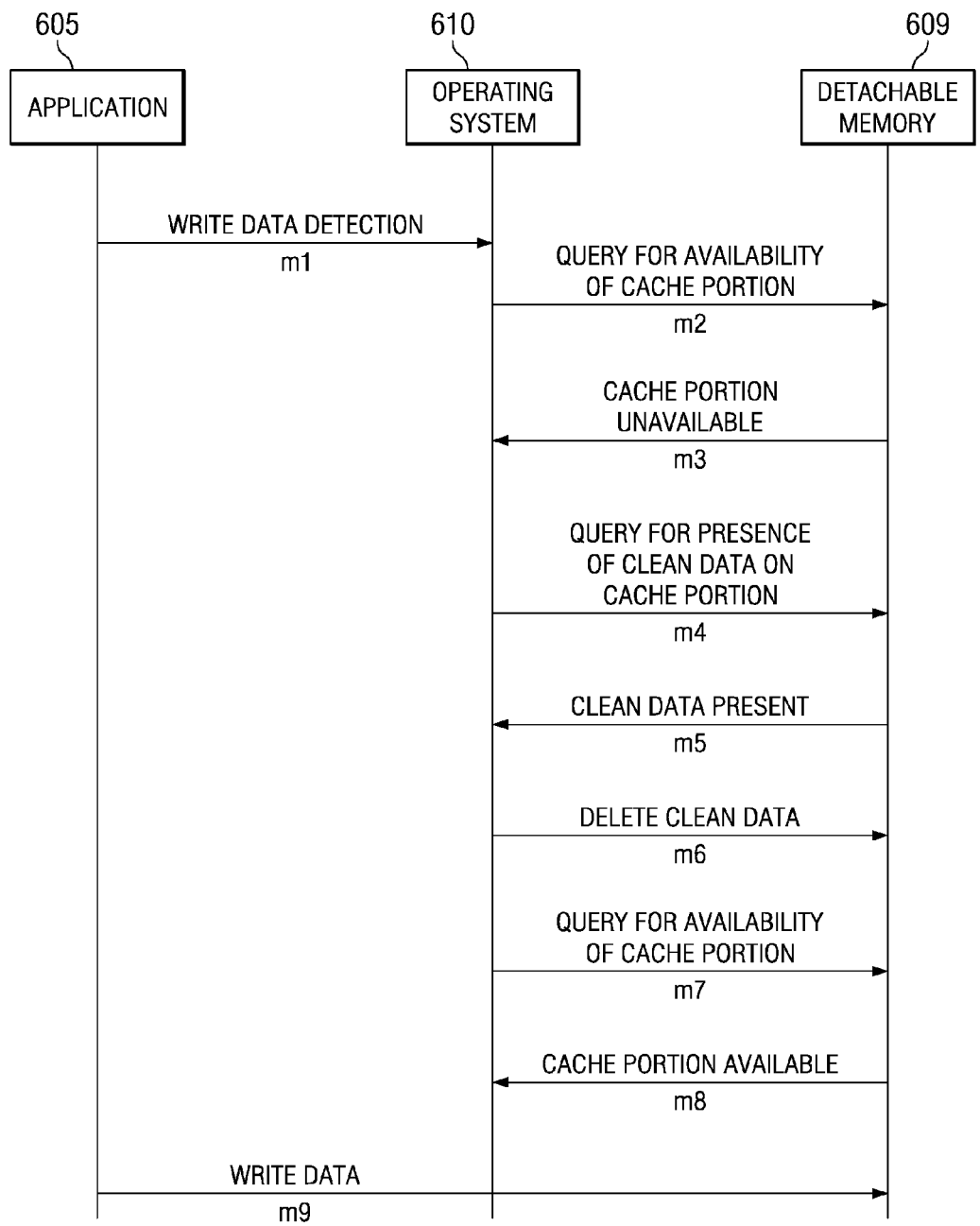
FIG. 6 is a diagram of a message flow between components of a system for storing data in a hybrid drive system in accordance with an illustrative embodiment.

Turning now to FIG. 6, a diagram of a message flow between components of a system for storing data in a hybrid drive system is depicted in accordance with an illustrative embodiment. Specifically, FIG. 6 illustrates a message flow between application 605, operating system 610, and detachable memory 609. Examples of application 605, operating system 610, and detachable memory 609 are application 605, operating system 610, and detachable memory 509 in FIG. 5, respectively.

The message flow begins when operating system 610 detects application 605 writing data to a storage device (message m1). Operating system 610 queries detachable memory 609 as to whether the cache portion of the detachable memory is available (message m2). At message m3, detachable memory 609 informs operating system 610 that the cache portion of detachable memory 609 is unavailable.

Operating system 610 queries detachable memory 609 for the presence of clean data on the cache portion of detachable memory 609 (message m4). At message m5, detachable memory 609 informs operating system 610 that clean data is present on detachable memory 609.

Operating system 610 then deletes clean data from detachable memory 609 (message m6). Operating system 610 queries detachable memory 609 as to whether the cache portion of the detachable memory is available (message m7). At message m8, detachable memory 609 informs operating system 610 that the cache portion of detachable memory 609 is available. Data from application 605 is then written to the cache portion of detachable memory 609 (message m9).

Figure 7:
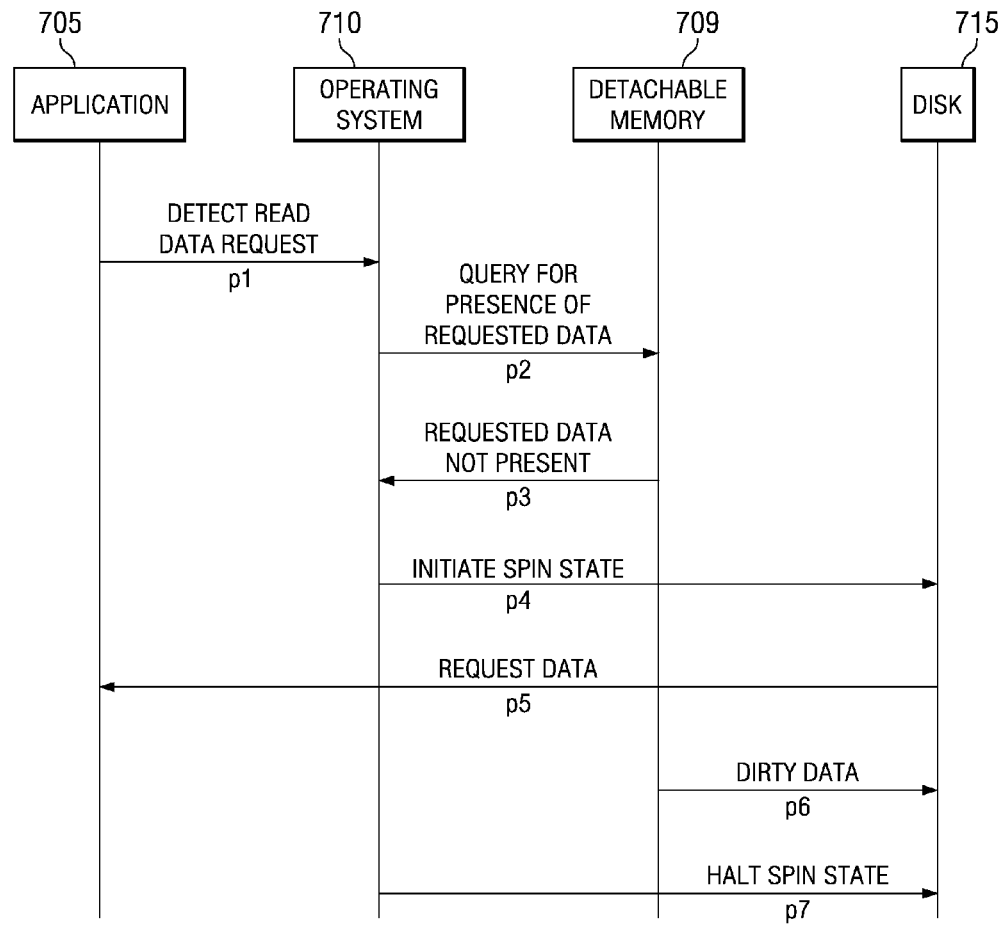
FIG. 7 is a diagram of a message flow between components of a system for reading data in a hybrid drive system in accordance with an illustrative embodiment.

Turning now to FIG. 7, a diagram of a message flow between components of a system for reading data in a hybrid drive system is depicted in accordance with an illustrative embodiment. Specifically, FIG. 7 illustrates a message flow between application 705, operating system 710, detachable memory 709, and disk 715. Examples of application 705, operating system 710, detachable memory 709, and disk 715 are application 705, operating system 510, detachable memory 509, and disk 515 in FIG. 5, respectively.

The message flow begins when operating system 710 detects a data request by application 705 (message p1). Operating system 710 queries detachable memory 709 as to whether the requested data is present on the cache portion of detachable memory 709 (message p2). At message p3, detachable memory informs operating system 710 that the cache portion of detachable memory 709 does not contain the requested data.

Operating system 710 then instructs disk 715 to enter a spin state (message p4). While disk 715 is in a spin state, the requested data is read from disk 715 and sent to application 705 (message p5). Also, while disk 715 is in a spin state, dirty data is transferred from detachable memory 709 to disk 715 (message p6). Operating system 710 then halts the spin state for disk 715 (message p7).

Figure 8:
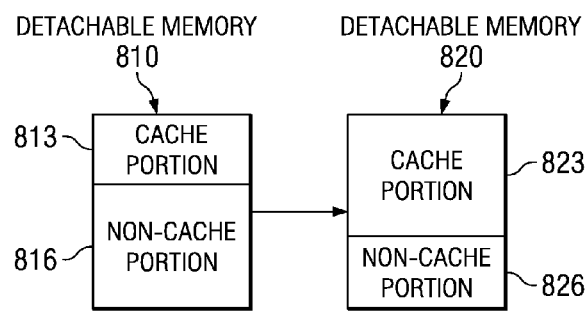
FIG. 8 is a diagram of a detachable memory in a system for managing data in a hybrid drive system in accordance with an illustrative embodiment.

Turning now to FIG. 8, a diagram of a detachable memory in a system for managing data in a hybrid drive system is depicted in accordance with an illustrative embodiment. Specifically, FIG. 8 shows detachable memories 810 and 820, which represent two configurations of a detachable memory, such as detachable memory 509 in FIG. 5.

Detachable memory 810 contains cache portion 813 and non-cache portion 816. Non-limiting examples of cache portion 813 and non-cache portion 816 are cache portion 525 and non-cache portion 530 in FIG. 5, respectively. In one embodiment, cache portion 813 includes any portion of detachable memory 810 that is occupied by non-cache portion 816. For example, if detachable memory 810 contains 6 gigabytes of storage space, and non-cache portion 816 used 2 gigabytes of storage space, then cache portion 813 would have a storage size of 4 gigabytes.

Non-cache portion 816 may include user files. User files include any files that have been directly or indirectly transferred to detachable memory 810 by a user, such as user 560 in FIG. 5. In one embodiment, cache portion 813 is the portion of detachable memory 810 that is not occupied by user files.

In one non-limiting example of this embodiment, detachable memory 810 contains 2 gigabytes of storage space, and non-cache portion 816 contains 1.5 gigabytes of user files. In this example, the 1.5 gigabytes of user files includes an image file, such as a .jpg or .gif file, having a size of 700 megabytes. If a user deletes the 700 megabyte image file, then the configuration of detachable memory 810 would change to the configuration of detachable memory 820. Detachable memory 820 contains 2 gigabytes of storage space and has a cache portion 823 of 1.2 gigabytes and a non-cache portion 816 of 800 megabytes. If a user then transferred a 200 megabyte movie file to detachable memory 820, the configuration of detachable memory 820 would change such that both cache portion 823 and non-cache portion 826 would contain 1 gigabyte of storage space.

In another embodiment, cache portion 813 of detachable memory 810 is a user-definable portion of detachable memory 810. A user may use a user interface on a data processing system to which detachable memory 810 is attached to allocate a portion of detachable memory 810 as cache portion 813. For example, if detachable memory 810 contains 2 gigabytes of storage space, a user may allocate 1.5 gigabytes of detachable memory 810 as cache portion 813.

Alternatively, a user may use a user interface to make detachable memory 810 appear smaller than the actual size of detachable memory 810 such that the difference between the apparent size and actual size of detachable memory 810 is allocated to cache portion 813. For example, if detachable memory 810 contains 2 gigabytes of storage space, a user may set detachable memory 810 to appear as though detachable memory 810 contains 1 gigabyte of storage space. Because the difference between the apparent size and actual size of detachable memory 810 is 1 gigabyte, cache portion 813 would have a size of 1 gigabyte.

Figure 9:
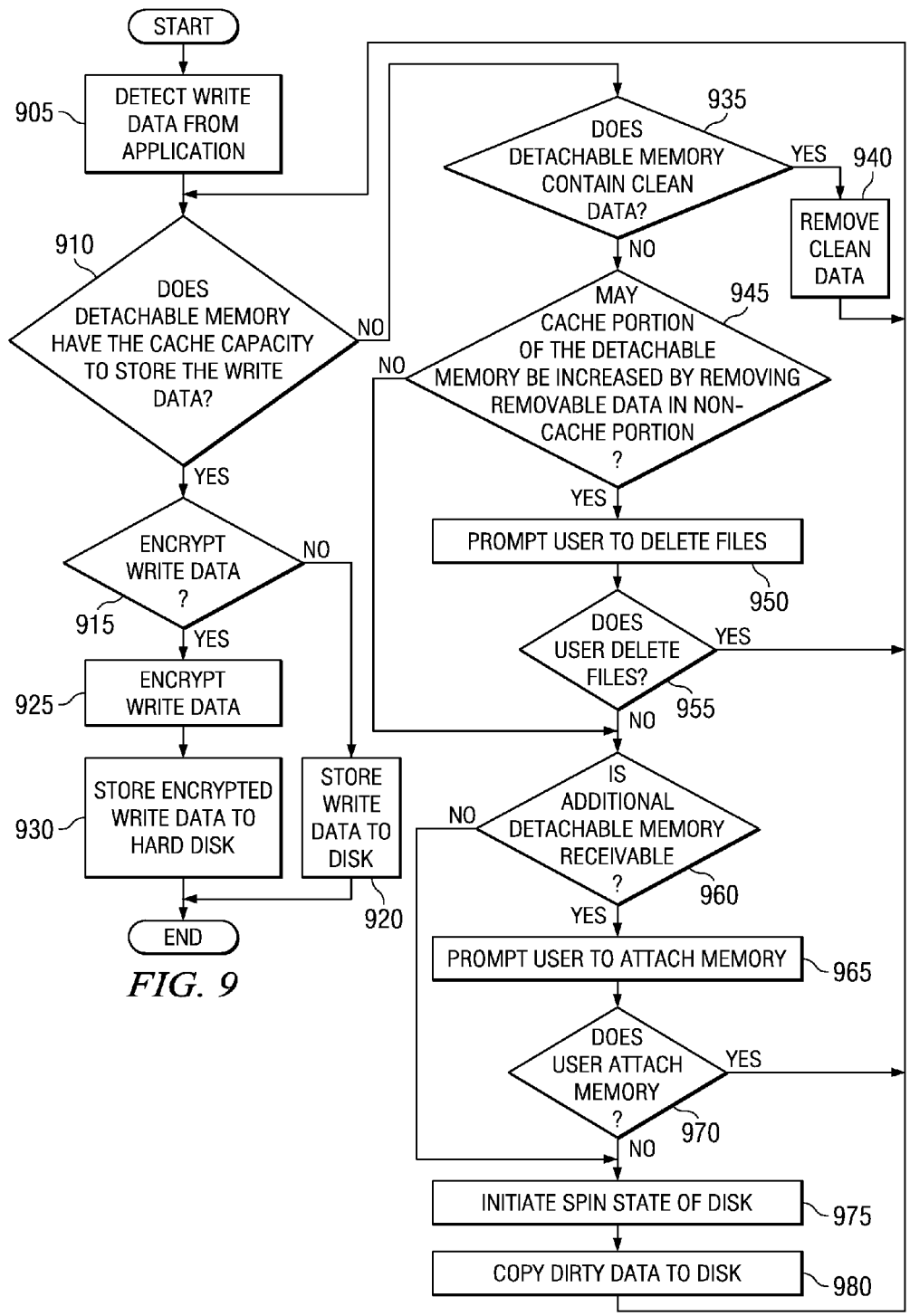
FIG. 9 is a flowchart illustrating a process for managing data in a hybrid drive system in accordance with an illustrative embodiment.

Turning now to FIG. 9, a flowchart illustrating a process for managing data in a hybrid drive system is depicted in accordance with an illustrative embodiment. The process illustrated in FIG. 9 may be implemented by an operating system or device driver, such as operating system 510 and device driver 520 in FIG. 5, respectively.

The process begins by detecting write data being sent from an application (step 905). The write data in step 905 is an example of write data 507 in FIG. 5. The process determines whether the detachable memory has the storage capacity to store the write data (step 910).

If the process determines that the detachable memory has the storage capacity to store the write data, the process then determines whether to encrypt the write data (step 915). If the process determines not to encrypt the write data, then the write data is stored to the disk (step 920). The process then terminates.

Returning to step 915, if the process determines to encrypt the write data, then the write data is encrypted (step 925). The encrypted write data is then stored to the disk (step 930). The process then terminates.

Returning to step 910, if the process determines that the detachable memory does not have the storage capacity to store the write data, the process determines whether the cache portion of the detachable memory contains clean data (step 935). If the process determines that the cache portion of the detachable memory does contain clean data, the clean data is removed from the cache portion of the detachable memory (step 940).

Returning to step 935, if the process determines that the cache portion of the detachable memory does not contain clean data, the process determines whether the cache portion of the detachable memory may be increased by removing removable data in the non-cache portion (step 945). In one embodiment, step 945 is not performed by the process. If the process determines that the cache portion of the detachable memory may be increased by removing removable data in the non-cache portion, then the process prompts a user to delete files in the non-cache portion (step 950). The process then determines whether the user has deleted files in the non-cache portion (step 955). If the process determines that the user has deleted files, the process returns to step 910. If the process determines that the user has not deleted files, the process proceeds to step 960.

Returning to step 945, if the process determines that the cache portion of the detachable memory may not be increased by removing removable data in the non-cache portion, the process determines whether additional detachable memory is receivable (step 960). In one embodiment, step 960 is not performed by the process. If additional detachable memory is receivable, the process prompts the user to attach additional detachable memory (step 965). The process then determines whether the user has attached additional detachable memory (step 970). If the user has attached additional detachable memory, the process returns to step 910. If the user does not attach additional detachable memory, the process proceeds to step 975.

Returning to step 960, if the process determines that additional detachable memory is not receivable, the process initiates a spin state for the disk (step 975). The process copies dirty data to the disk (step 980). In one embodiment, the dirty data becomes clean data upon being copied to the disk. The process then returns to step 910.

Figure 10:
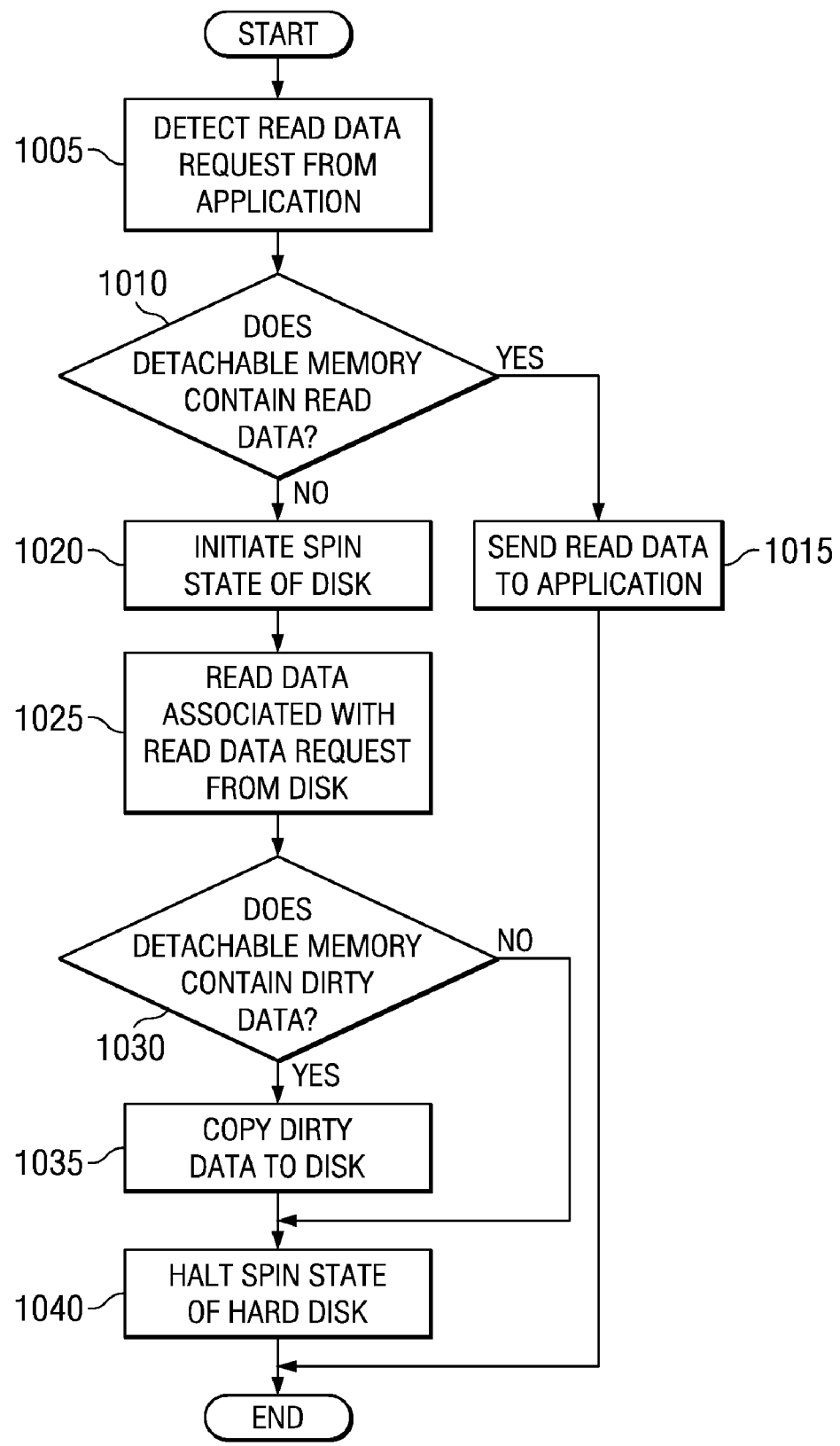
FIG. 10 is a flowchart illustrating a process for managing data in a hybrid drive system in accordance with an illustrative embodiment.

Turning now to FIG. 10, a flowchart illustrating a process for managing data in a hybrid drive system is depicted in accordance with an illustrative embodiment. The process illustrated in FIG. 10 may be implemented by an operating system or device driver, such as operating system 510 and device driver 520 in FIG. 5, respectively.

The process begins by detecting a read data request originating from an application (step 1005). An example of read data is data 517 in FIG. 5. The process then determines if the cache portion of the detachable memory contains the read data (step 1010). If the process determines that the cache portion of the detachable memory contains the read data, the read data is sent to the application from the cache portion of the detachable memory (step 1015). The process then terminates.

Returning to step 1010, if the process determines that the cache portion of the detachable memory does not contain the read data, the process initiates a spin state for the disk (step 1020). The process then reads data associated with the read data from the disk (step 1025).

The process determines whether the cache portion of the detachable memory contains dirty data (step 1030). If the process determines that the cache portion of the detachable memory contains dirty data, the dirty data is copied onto the disk (step 1035). The process then halts the spin state of the disk (step 1040). The process then terminates.

Returning to step 1030, if the process determines that the cache portion of the detachable memory does not contain dirty data, the process halts the spin state of the disk (step 1040) and then terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

The illustrative embodiments described herein provide an apparatus and method for managing data in a hybrid drive system. In one embodiment, a process determines whether the detachable memory contains clean data in response to identifying that a cache portion of a detachable memory is unavailable. Clean data is data that does not require a disk to be in a spin state in order to be removed from the detachable memory.

In one embodiment, the cache portion of a detachable memory is unavailable if the detachable memory does not include a sufficient amount of storage space to store data that is being written to the cache portion by any component of a data processing system.

The process removes the clean data from the detachable memory in response to determining that the detachable memory contains the clean data. In one example, removing the clean data from the detachable memory includes deleting the clean data from the detachable memory.

The process stores the data on the detachable memory. In one embodiment, the process of storing the data on the detachable memory includes encrypting the data to form encrypted data. In this embodiment, the process stores the encrypted data on the detachable memory.

In another embodiment, a process identifies that a detachable memory does not contain requested data. The process reads the requested data from a disk while the disk is in a spin state. The process initiates a transfer of dirty data from the detachable memory to the disk while the disk is in the spin state. Dirty data requires the disk to be in the spin state to be removed from the detachable memory.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for accessing data in a hybrid drive system, comprising:

responsive to receiving a request to store write data in the hybrid drive system, determining whether a cache portion of a detachable memory is unavailable;

responsive to a determination that the cache portion of the detachable memory is unavailable, determining whether the detachable memory contains clean data, wherein the clean data does not require a disk to be in a spin state to be removed from the detachable memory;

responsive to a determination that the detachable memory contains the clean data, removing the clean data from the detachable memory;

storing the write data on the detachable memory after removing the clean data; and responsive to initiating removal of the detachable memory from the hybrid drive system by unmounting the detachable memory, flushing dirty data from the detachable memory to the disk.

2. The computer-implemented method of claim 1, further comprising:

identifying whether the cache portion of the detachable memory is expandable.

3. The computer-implemented method of claim 2, wherein identifying whether the cache portion of the detachable memory is expandable further comprises:

identifying whether a non-cache portion of the detachable memory contains removable data.

4. The computer-implemented method of claim 3, further comprising:

responsive to identifying that the non-cache portion of the detachable memory contains removable data, sending a prompt to a user to remove the removable data.

5. The computer-implemented method of claim 2, wherein identifying whether the cache portion of the detachable memory is expandable further comprises:

identifying whether additional detachable memory is receivable by the data processing system.

6. The computer-implemented method of claim 5, further comprising:

expanding the cache portion of the detachable memory to include a cache portion of the additional detachable memory.

7. The computer-implemented method of claim 1, wherein removing the clean data from the detachable memory further comprises:

deleting the clean data from the detachable memory.

8. The computer-implemented method of claim 1, wherein the cache portion of the detachable memory is a user-definable portion of the detachable memory.

9. The computer-implemented method of claim 1, wherein the cache portion of the detachable memory is a portion of the detachable memory that is not occupied by user files.

10. The computer-implemented method of claim 1, wherein the cache portion of the detachable memory is aggregated with another cache portion of a non-detachable memory to form an aggregated cache portion.

11. The computer-implemented method of claim 1, wherein the detachable memory is a universal serial bus storage device.

12. The computer-implemented method of claim 1, wherein storing the write data on the detachable memory further comprises:
  encrypting the write data to form encrypted data; and
  storing the encrypted data on the detachable memory.

13. The computer-implemented method of claim 1, wherein identifying that the cache portion of the detachable memory is unavailable further comprises:
  identifying that the cache portion of the detachable memory does not include a sufficient amount of storage space to store the write data.

14. The computer-implemented method of claim 1, further comprising:
  responsive to receiving a request to read requested data in the hybrid system, determining whether the detachable memory contains the requested data;
  responsive to determining that the detachable memory does not contain the requested data, reading the requested data from the disk and initiating a transfer of the dirty data from the detachable memory to the disk while the disk is in the spin state.

15. The computer-implemented method of claim 14, wherein the dirty data, after the transfer of the dirty data from the detachable memory to the disk while the disk is in the spin state, becomes the clean data.

16. A computer program product in a computer-readable medium for storing write data in a hybrid drive system, the computer program product comprising:
  computer-usable program code, responsive to receiving a request to store the write data in the hybrid drive system, for determining whether a cache portion of a detachable memory is unavailable;
  computer-usable program code, responsive to a determination that the cache portion of the detachable memory is unavailable, for determining whether the detachable memory contains clean data, wherein the clean data does not require a disk to be in a spin state to be removed from the detachable memory;
  computer-usable program code, responsive to a determination that the detachable memory contains the clean data, for removing the clean data from the detachable memory;
  computer-usable program code for storing the write data on the detachable memory after removing the clean data; and
  computer-usable program code, responsive to removal of the detachable memory from the hybrid drive system, for halting operations associated with the disk and displaying a warning to reattach the detachable memory to the hybrid drive system.

17. The computer program product of claim 16, further comprising:
  computer-usable program code for identifying whether the cache portion of the detachable memory is expandable.

18. The computer program product of claim 17, wherein the computer-usable program code for identifying whether the cache portion of the detachable memory is expandable further comprises:
  computer-usable program code for identifying whether a non-cache portion of the detachable memory contains removable data.

19. The computer program product of claim 16, further comprising:
  computer-usable program code for expanding the cache portion of the detachable memory to include a cache portion of an additional detachable memory.

20. The computer program product of claim 16, wherein the cache portion of the detachable memory is a user-definable portion of the detachable memory.

21. The computer program product of claim 16, wherein the detachable memory is a universal serial bus storage device.

22. The computer program product of claim 16, wherein the computer-usable program code for storing the write data on the detachable memory further comprises:
  computer-usable program code for encrypting the write data to form encrypted data; and
  computer-usable program code for storing the encrypted data on the detachable memory.

23. The computer program product of claim 16, wherein identifying that the cache portion of the detachable memory is unavailable further comprises:
  computer-usable program code for identifying that the cache portion of the detachable memory does not include a sufficient amount of storage space to store the write data.

24. A data processing system comprising:
  a bus system;
  a memory connected to the bus system, wherein the memory includes a set of instructions; and
  a processing unit connected to the bus system, wherein the processing unit executes the set of instructions to determine whether a cache portion of a detachable memory is unavailable in response to receiving a request to store the write data in the hybrid drive system; determine whether the detachable memory contains clean data in response to determining that the cache portion of the detachable memory is unavailable, wherein the clean data does not require a disk to be in a spin state to be removed from the detachable memory; remove the clean data from the detachable memory in response to determining that the detachable memory contains the clean data; store the write data on the detachable memory after removing the clean data; and lock the detachable memory to the data processing system until the detachable memory is unmounted from the data processing system.

25. The data processing system of claim 24, wherein the processing unit further executes the set of instructions to identify whether the cache portion of the detachable memory is expandable.

26. The data processing system of claim 25, wherein the set of instructions to identify whether the cache portion of the detachable memory is expandable further comprises the set of instructions to identify whether a non-cache portion of the detachable memory contains removable data.

27. The data processing system of claim 24, wherein the processing unit further executes the set of instructions to expand the cache portion of the detachable memory to include a cache portion of an additional detachable memory.

28. The data processing system of claim 24, wherein the cache portion of the detachable memory is a user-definable portion of the detachable memory.

29. The data processing system of claim 24, wherein the set of instructions to store the write data on the detachable memory further comprises:
  the set of instructions to encrypt the write data to form encrypted data; and
  the set of instructions to store the encrypted data on the detachable memory.

30. The data processing system of claim 24, wherein the set of instructions to identify that the cache portion of the detachable memory is unavailable further comprises the set of instructions to identify that the cache portion of the detachable memory does not include a sufficient amount of storage space to store the write data.

31. A computer-implemented method for deploying computer readable code for managing data on a hybrid drive system to a customer, the method comprising:
    receiving a set of parameters about the hybrid drive system from the customer;
    identifying a data management application for use in response to receiving the set of parameters to form an identified data management application comprising computer usable program code capable of determining whether a cache portion of a detachable memory is unavailable in response to receiving a request to store write data in the hybrid drive system; determining whether the detachable memory contains clean data in response to determining that the cache portion of the detachable memory is unavailable, wherein the clean data does not require a disk to be in a spin state to be removed from the detachable memory; removing the clean data from the detachable memory in response to determining that the detachable memory contains the clean data; and, storing the write data on the detachable memory after removing the clean data when the computer usable program code is deployed in a data processing system; and
    deploying the identified data management application to the data processing system.

32. The computer-implemented method of claim 31, wherein the deploying step comprises:
    transmitting computer usable program code for the identified data management application to the data processing system, wherein the computer usable program code is a device driver that is used to access the detachable memory by the data processing system.

33. A computer-implemented method for managing data in a hybrid drive system, comprising:
    responsive to receiving a request to read requested data, identifying that a detachable memory does not contain the requested data;
    responsive to identifying that the detachable memory does not contain the requested data, reading the requested data from a disk and initiating a transfer of dirty data from the detachable memory to the disk while the disk is in a spin state,
    wherein the dirty data requires the disk to be in the spin state to be removed from the detachable memory, wherein the identifying, reading and initiating steps are performed by a device driver that is used to access the detachable memory.

34. The computer-implemented method of claim 33, wherein the device driver comprises a detachable memory removal module that manages removal of the detachable memory from the hybrid drive system by controlling a lock that prevents removal of the detachable memory from the hybrid drive system until the detachable memory is unmounted from the hybrid drive system, and wherein unmounting the detachable memory from the hybrid drive system initiates a transfer of the dirty data from the detachable memory to the disk.

35. The computer-implemented method of claim 33, further comprising:
    responsive to receiving a request to store write data in the hybrid drive system, determining whether a cache portion of a detachable memory is unavailable;
    responsive to a determination that the cache portion of the detachable memory is unavailable, determining whether the detachable memory contains clean data, wherein the clean data does not require the disk to be in the spin state to be removed from the detachable memory; and
    responsive to a determination that the detachable memory contains the clean data, removing the clean data from the detachable memory.

* * * * *